M. S. NORTON.
Machine for Sawing-Lath.
No. 160,838. Patented March 16, 1875.
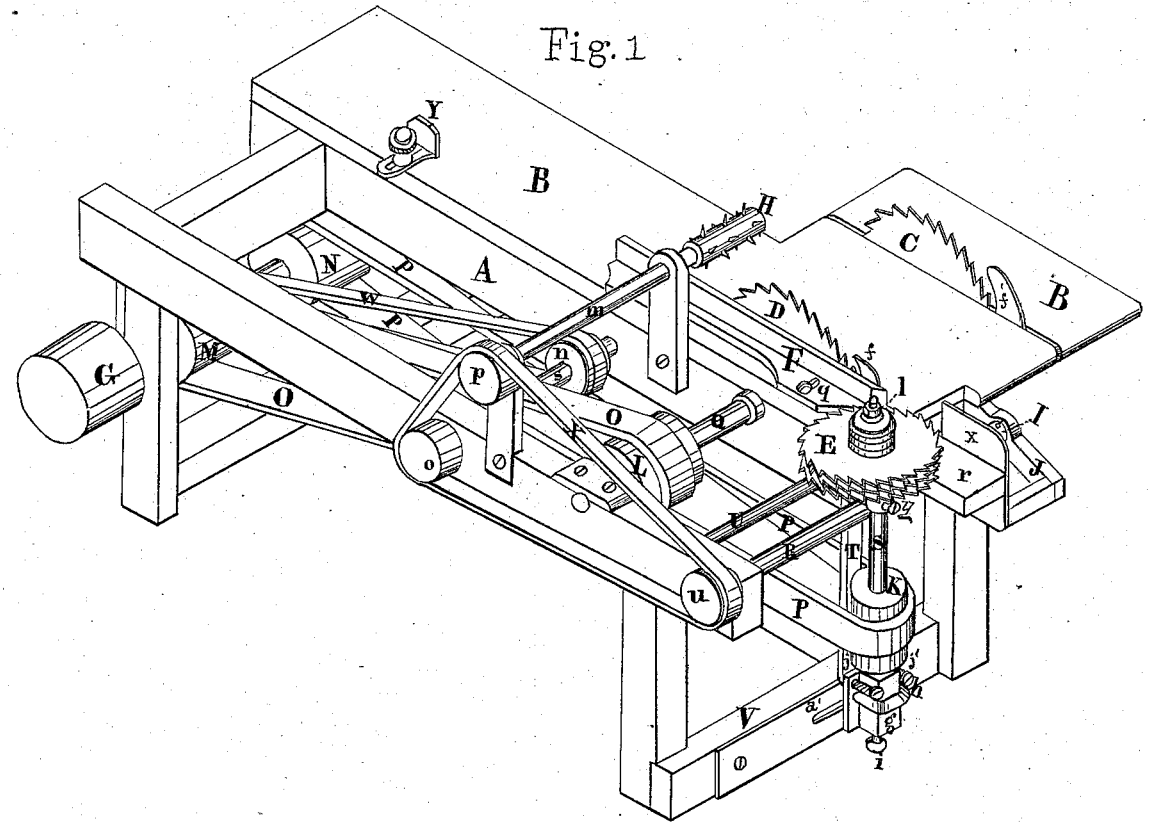
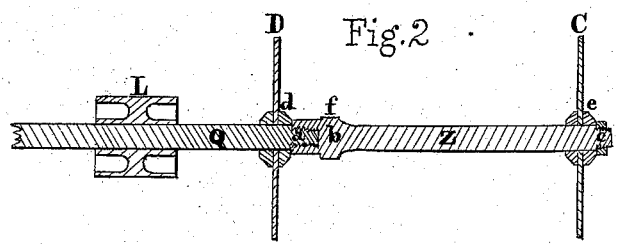
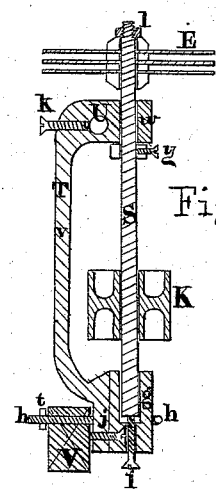
Witnesses
Fred. H. Coombs.
Chas. B. Usher.
Inventor
M. S. Norton.
THE GRAPHIC CO. PHOTO-LITH. 39 & 41 PARK PLACE, N.Y.

UNITED STATES PATENT OFFICE.

MASON S. NORTON, OF BANGOR, MAINE, ASSIGNOR TO JESSE E. HARRIMAN, OF SAME PLACE.

IMPROVEMENT IN MACHINES FOR SAWING LATHS.

Specification forming part of Letters Patent No. 160,838, dated March 16, 1875; application filed January 19, 1875.

*To all whom it may concern:*

Be it known that I, MASON SAWIN NORTON, of Bangor, in the State of Maine, have invented a Machine for Sawing Laths and Short Lumber, of which the following is a specification:

The object of my invention is to construct a machine which will saw and bolt laths and other short lumber, such as staves and spool-stuff.

In the accompanying drawings, Figure 1 is a perspective view of my lath-machine. Fig. 2 is a sectional view of the saws and arbor. Fig. 3 is a sectional view of the gang-saws and the adjustable boxes.

In the several figures similar letters refer to corresponding parts.

A is the frame; B B, the table; C, a bolting-saw; D, a splitting or bolting saw; E, a gang of lath-saws; F, an adjustable gage. G M N L K are driving-pulleys. H I are toothed rolls. J is an inclined frame. O P W X are belts. Q R U are shafts or arbors. S is an upright shaft or arbor to the gang E of saws. T is a double adjustable box. V is a crossbar of the frame. Y is a gage. Z is the shaft of the saw C. $a$ is a screw cut on the end of the arbor Q. $b$ is the end of the shaft Z, in which is a female screw. $c$ is a screw and nut on the end of Z. $d$ and $e$ are collars. $f$ is a nut formed on Z. $g$ and $w$ are the upper and lower boxes of T. $h$ is a staple with screw-nuts. $i, j$, and $y$ are set-screws. $j'$ and $k$ are also set-screws. $l$ is the nut which holds the collars to the gang E. $m$ and $s$ are shafts. $n$ $o$ $p$ $u$ are pulleys. $q$ is an adjusting-screw in F. $t$ is a nut on $h$. $v$ is the spine which connects the boxes $w$ and $g$.

In the ordinary method of sawing laths a bolting-saw is set independently from the saw intended for sawing the laths, and this requires the attendance of two men to run the slabs through and edge them up suitable to go to the lath-saw. One man pushes the slab about half-way past the bolting-saw, and another man pulls it the balance of the way. The bolt is then taken to the lath-saw, a gage is set for the thickness of one lath, the bolt is pushed half-way past the saw by one man and pulled the balance of the way by another man, sawing one lath off of the bolt at each passage, and, while the second man is pulling the bolt past the saw with one hand, he passes back the preceding bolt, to be again run past the saw, taking off a lath at each passage, until the bolt is entirely sawed up into laths.

In this machine the construction and operation are as follows: The table A is constructed, having an extended top, B B. The saw D is hung upon the arbor Q in the usual manner, (but the arbor Q has a screw cut upon it at $a$,) and the arbor Z, having a female screw cut in the end at $b$, and having an enlargement at $f$ to form a nut upon which to apply a wrench, is screwed onto Q at $a$, and supplies the place of the ordinary nut to secure the collar $d$ in its place. A saw, C, is then hung on the arbor Z, and secured, by the collar $e$ and nut $c$, in the usual manner, thus enabling two saws to be run on the same continuous line of shafting, and to be placed in a convenient position in the same machine, so that the saw C may have a gage set to any desirable size; and if, in sawing laths, it should be found profitable to pick out picket-stuff or any other size of lumber, it could be run through past the saw C without inconvenience, and without changing the gage F at the saw D; and in many other cases, in sawing short lumber, the arrangement of the saw C with reference to the saw D is a very great convenience; and it may be used to take the extreme edge off of slabs to be afterward run through the saw D. A slab, when taken to the saw D, is pushed up against the gage F, which is set just far enough from the saw D to allow a bolt to be cut from the slab sufficiently wide to form the width of the lath, and as this bolt passes forward the gang of saws E, having been set just far enough apart on the arbor to form the thickness of the lath, splits the bolt horizontally, so that when a slab is pushed up against the gage F under the toothed roll H, and started forward past the saw D, it is carried forward by feed-rolls past the saw D and the saws E, and a bolt is taken off by the saw D, which splits the slab, cutting vertically; and this bolt in passing the gang of saws E is split horizontally to any desired thickness, so as to leave the machine at *r* manufactured complete from the slab at one operation into laths, pickets, spool-stuff, or any desirable size. The part of the slab which has not been manufactured passes by the saw D, on the side opposite to the gage F, and, passing forward to the inclined frame J, tips down, and is caught upon the teeth of the roll I. This roll is so belted or geared as to revolve toward the rear of the machine, and carries the slab back until it tips upon the roll H, which, also having a backward revolution, keeps the slab running backward until it falls onto the table, just in position to again run forward past the saw D and the gang E. When the slab is passed backward, and drops upon the table, it is pushed up to the gage F; and, in order to keep the rear end of the slab in line with F, the adjustable gage Y is supplied.

The gang of saws E are liable to need several adjustments. The lower saw must be adjusted to the proper height from the table to make the lower lath of the proper thickness. The saws must be parallel to the top of the table, in the direction of the width of the laths, or the lower lath would be thicker at one edge than at the other. The saws must be parallel to the length of the table, or the bolts would run and be sawed crooked, and there would be danger of breaking the saws. In order to effect all these adjustments, I construct a double box, T, or a pair of boxes, *g* and *w*, connected by the spine *v*, and hung on the rod U, and fastened at the lower end to the cross-bar V. By hanging on the rod U, the boxes may be swung so as to adjust the saws to be parallel to the top of the table in the direction of its length, and this adjustment is regulated by the staple *h*, passing through V and provided with the screw-nuts *t*, and acting in connection with the set-screws *j j'*. The staple *h* passes through V in the slot *a'*, which allows of adjusting the saws in the direction of the width of the table, and the set-screw *i* adjusts the saws to the proper thickness from the top of the table by moving the arbor S up or down in the box *g*.

As the saws comprised in the gang E wear away, it becomes necessary to adjust them up to the bolt, so as to just cut through the bolt. This is done by means of the set-screw *k* in the upper box acting upon the rod U, and allowing the upper box and end of the shaft S to be moved to or from the table, while the staple or clasp *h*, moving in the slot *d'*, allows the similar movement to the lower end. A screen or shield, *x*, prevents the laths from falling onto the roll I, which carries back the slab. The two iron blades *f f'*, fixed behind the saws D C, respectively, serve to spread open the saw-cut and prevent any spring of the lumber in the cut from binding the saws.

The set-collar *y* is intended to be adjustable on the shaft S, so as to allow the shaft to be adjusted, and at the same time it can be fastened on the shaft S, so as to prevent the shaft S from rising in the boxes, and allowing the gang E to rise and vary the distance from the table to the lower saw.

The lower box *g* of the double boxes T is capped at the lower end, in order to make a bearing for the lower end of the upright shaft S, and to allow of using the set-screw *i*.

The saws comprised in the gang E are kept at the proper distance apart, and adjusted to any desired distance by the use of collars.

I do not claim as new any of the devices common to lath-sawing machines; but

What I claim as my invention, and desire to secure by Letters Patent, is—

The combination of the bolting-saws C D with the gang-saws E, double adjustable box T, rolls H I, and gages F Y, to form a machine for sawing laths, all as shown and described, and substantially as and for the purpose hereinbefore set forth.

M. S. NORTON.

Witnesses:
 FRED. H. COOMBS,
 ELLES B. USHER.